Patented Feb. 13, 1934

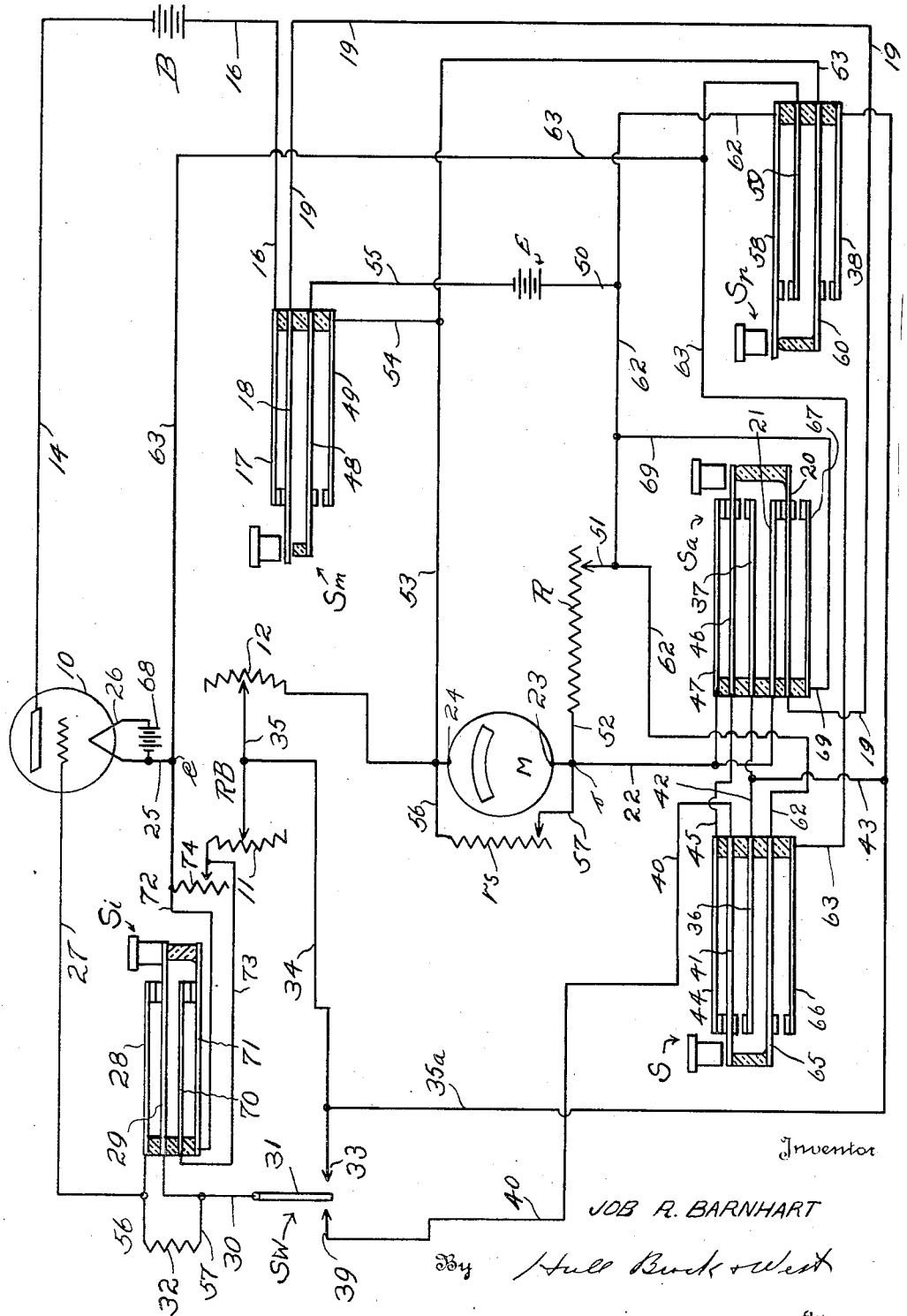

1,946,466

UNITED STATES PATENT OFFICE 1,946,466

TUBE TESTER

Job R. Barnhart, Lakewood, Ohio, assignor of one-half to Walter M. Scott, Lakewood, Ohio, and one-half to Raleigh E. Tresise, Cleveland Heights, Ohio Application July 29, 1931. Serial No. 553,806

7 Claims. (Cl. 250—27)

This invention relates to a tube tester similar in some respects to that disclosed in my Patent No. 1,808,013 issued on June 2, 1931.

An object of the invention is to provide a tube tester capable of determining quickly and accurately the mutual conductance, the amplification factor, the plate resistance and the ionization factor of a vacuum tube.

A further object of the invention is to provide such a device in which a resistance value heretofore determined by a calibrated dial fixed with respect to one portion of a variable resistor is indicated on a meter which may be of large size whereby to be readily visible.

A further object is to provide for the reading of such resistance value on an instrument having equally or substantially equally spaced divisions on the dial thereof.

A further object is to provide means for establishing a local circuit through a meter which is used in setting said resistance for the purpose of indicating the value of such resistance after it has been set.

A further object is to provide means for setting such meter to show a full scale reading at different impressed potentials whereby to compensate for changes in the E. M. F. used for establishing such local circuit.

With the foregoing and other and more limited objects in view, the invention consists in the combination of elements and arrangement of parts hereinafter more fully described and claimed.

The figure is a schematic representation of the circuits employed in my improved tube tester.

The embodiment of my invention illustrated in the accompanying drawing includes, a socket for the tube 10, a multi-part, proportional resistor indicated generally by the numeral RB, a meter M, a variable resistor R, together with suitable conductors, switches and sources of electric current either direct or alternating as desired. From the plate binding post of the socket for the tube 10, a conductor 14 extends to a source of current B which may be a battery as indicated or any other suitable source. From the other side of the source of current B, a conductor 16 extends to the switch element 17 of the switch Sm which is normally in contact with the switch element 18 thereof. A conductor 19 extends from the switch element 18 to switch element 20. The switch element 20 is normally in contact with 21 to which is connected a conductor 22 which is in turn connected to one binding post 23 of the meter M. To the binding post 24 of the meter M is connected one branch 12 of the multi-part resistor RB, the other branch 11 thereof being normally connected by conductors 73, 72 and 25 with the cathode 25. The multi-part resistor RB is constructed so that the ratio of the resistance values of the branches 11 and 12 thereof is a constant for all positions of the movable element 35.

From the grid contact of the socket for the tube 10 extends a conductor 27 which is connected to a switch element 28 of the switch Si. From the switch element 29 a conductor 30 extends to and connects with the movable member 31 of a double throw switch SW. The switch elements 28 and 29 are normally in contact and are in parallel with a resistor 32. From the contact 33 of the switch SW, a conductor 34 extends to the movable element 35 of the multi-part resistor RB. A conductor 35a connects the conductor 34 with switch elements 36, 37 and 38 for a purpose hereinafter set forth. From the contact 39 of the switch SW, a conductor 40 extends to and connects with the switch element 41. When the switch element 41 is depressed, it contacts the element 36, thus completing a connection from the grid through conductors 27, 30, 40, 42, 43, 35a and 34 to the member 35 whereby in one position of the balancing switch S the grid is connected to the member 35 and in another position thereof is connected to a point separated from the cathode 26 by both branches of the resistor RB. It is obvious therefore that the grid bias may be changed, by the value of the potential drop across the branch 12 of the resistor RB, through the operation of the switch S. When the switch S is in normal position, the circuit from the grid to the point O is through the conductors 27, 30, 40, switch elements 41 and 44, conductor 45, switch elements 46 and 47 and conductor 22. The switch Sm, when in normal position, has its elements 17 and 18 in contact but, when this switch is depressed, these elements are separated while the elements 48 and 49 are brought into contact. This results in breaking the plate circuit at 17 and 18 and establishing a local circuit from the source of current E through conductors 50 and 62 to the movable element of the resistor R, through the conductor 52, meter M, conductor 53, conductor 54, switch elements 48 and 49 and conductor 55. Obviously the setting of the resistor R will determine the reading of the meter M. A shunt resistor rs may be connected across the meter 12 by conductors 56 and 57 whereby to enable a full scale reading of the meter M to be secured for a given setting of R even though the potential of the source of current E should vary in value somewhat.

Mutual conductance ($G_m$)

Beginning with the various elements in the positions shown, the switch SW is set so that the movable member 31 thereof is in contact with the point 39. Plate current then flows through conductors 25, 72, 73, multi-part resistor RB, meter M, conductor 22, switch elements 21 and 20, conductor 19, switch elements 18 and 17, conductor 16, source of current B and conductor 14. The grid of the tube 10 will be at the potential of the point $o$, the contact being made through conductor 22, switch elements 47 and 46, conductor 45, switch elements 44 and 41, conductor 40, switch SW, conductor 30, switch elements 29 and 28 and conductor 27. If now the switch S be depressed the grid will be at the potential of the member 35, the circuit being made through conductors 34, 35a, 43, 42, switch elements 36 and 41, conductor 40, switch SW, conductor 30, switch elements 29 and 28 and conductor 27. Obviously then depression of switch S changes the grid potential by an amount $rI$, where $r$ is the resistance of the branch 12 of the multi-part resistor RB. Such change will result in a change of plate current. If a resistor of proper value be shunted around the meter M and the resistor RB at the time the grid potential is changed by depression of the switch S, said meter will show no change. Such a resistor R is so shunted around the meter M and resistor RB by the depression of switch S, the circuit being made through conductor 52, resistor R, conductor 51, conductor 62, switch elements 65 and 66 and conductor 63. The resistor R, being variable, can be set to such value that the meter M will read the same in both positions of the switch S. The setting of resistor R when the meter shows no change is a measure of the mutual conductance of the tube 10 as will appear from the following:

Mutual conductance $G_m$ is defined as the ratio of change of plate current, $\Delta I_p$ to change of grid potential, $\Delta e_g$ producing it. This may be written $\Delta e_g G_m = \Delta I_p$. Also $rI = \Delta e_g$ where $r$ is the resistance of the branch 12 of the resistor BR. Substituting this new value of $\Delta e_g$ in the first equation $rIG_m = \Delta I_p$. From Ohm's law, $E = (r+r_1)I$, where E is the potential drop from $c$ to $o$ and $r_1$ is the resistance of the branch 11 of the resistor RB. When the resistor R has been set as indicated, $$-- = \Delta I_p$$

since the additional plate current is diverted through resistor R. It follows that, $$\frac{(r+r_1)I}{R} = \Delta I_p = rIG_m,$$

and, $$G_m = \frac{(r+r_1)(I}{RrI} = \frac{r+r_1}{r} \times \frac{1}{R}.$$

Since I know the value of the ratio $$\frac{r+r_1}{r},$$

I have but to assign to each chosen resistance value of R a value equal to the reciprocal of the resistance multiplied by the value of the ratio $$\frac{r+r_1}{r}.$$

The mutual conductance of the tube 10 may, therefore, be read off from a suitably calibrated dial associated with the resistor R or preferably on a special scale on the meter M by the use of the local circuit established by depression of the switch $S_m$ through source of E. M. F. E, resistor R and meter M.

Plate resistance ($R_p$)

Switch SW is set with movable member 31 contacting point 33. This, in the absence of operation of $S_1$ keeps the grid of the tube 10 at the potential of the member 35. With the other switches set as in the drawing a current will be flowing in the plate circuit; and the same will be indicated by the meter M. Now if the switch $S_p$ be depressed, leaving the others in normal position except SW as mentioned, the switch elements 58 and 59 will be brought into contact as will also those 60 and 38. This will serve to connect the resistor R in parallel with the multi-part resistor RB and meter M which are in series, at the same time shorting out the branch 12 of said multi-part resistor. The resistor R is so connected by the circuit made through conductor 52, R, conductor 51, conductor 62, switch elements 58 and 59 and conductor 63. The branch 12 of RB is shorted out by the circuit made through conductor 53, switch elements 60 and 38 and conductors 35a and 34. Since in the resulting plate circuit the current divides, one portion going through the meter M and the branch 11 of the resistor RB and the other portion going through the resistor R which is not in series with the meter M, it is obvious that R can be adjusted so that the meter M will read the same for both positions of the switch $S_p$. This setting of the resistor R is a measure of the plate resistance $R_p$ of the tube, as will appear from the following:

When the resistance $r$ of the branch 12 of the resistor RB is removed by shorting out said branch, there is a change in plate voltage $\Delta e_p$ equal to $rI$, where I is the current flowing through the meter M. (It is here assumed that such current is the same for both positions of the switch $S_p$, the resistor R having been so adjusted. Note that operation of switch $S_p$ does not change the grid bias.) From Ohm's law, $$\frac{\Delta e_p}{r_p} = \Delta I_p \qquad (1)$$

The potential drop from the point $c$ to the point $o$ is $r_1 I$ where $r_1$ is the resistance of the branch 11 of the multi-part resistor RB. Since the current flowing through R against its resistance R is the change in plate current, and since the drop of potential across R is $r_1 I$, it follows that, $$\frac{r_1 I}{R} = \Delta I_p \qquad (2)$$

Equating (1) and (2)

$$\frac{\Delta e_p}{r_p} = \frac{r_1 I}{R}$$

Therefore, since $\Delta e_p = rI$, (see preceding paragraph)

$$\frac{rI}{r_p} = \frac{r_1 I}{R},$$

and $$r_p = \frac{Rr}{r_1}.$$

Since the value of $$\frac{r}{r_1}$$

is known, it is obvious that the plate resistance may be read in appropriate units from a calibrated scale associated with the resistor R or on a special scale on the meter M by the use of the local circuit established by the switch $S_m$ through E, R and M.

Amplification factor ($\mu$)

Beginning with the various elements in the positions shown, the switch SW is set with its element 31 contacting the point 39. The plate current now flows from the cathode 26, through conductors 25, 72, 73, resistor RB, meter M, conductor 22, switch points 21 and 20, conductor 19, switch elements 18 and 17, conductor 16, source of current B and conductor 14. The grid will be at the potential of the point o, the contact being made through conductor 22, switch elements 46 and 47, conductor 45, switch elements 41 and 44, conductor 40, switch SW, switch elements 29 and 28 and conductor 27. If switch Sa is depressed, the grid will be at the potential of the member 35, the contact being made through conductors 34, 35a, 43, 42, switch elements 37 and 46, conductor 45, switch elements 44 and 41, conductor 40, switch SW, switch elements 29 and 28 of the switch Si and conductor 27, and the resistor R will be inserted in series in the plate circuit, the latter then being from the cathode 26 through conductors 25, 72, 73, resistor RB, meter M, conductor 52, resistor R, conductors 51, 62, 69, switch elements 67 and 20, conductor 19, switch elements 18 and 17, conductor 16, source of current B and conductor 14.

Obviously the resistor R can be set so that the drop of potential thereacross will just neutralize the effective increase in plate potential due to the increase in grid potential, thereby maintaining constant the plate current. By "effective change of plate potential", $\Delta e_p$ is to be understood a hypothetical change in plate potential, i. e. the change in plate potential which would be required to produce the same change in plate current. When so set the resistance value of R is a measure of the amplification factor $\mu$, as will appear from the following:

Amplification factor $\mu$ is defined as the ratio of effective change in plate potential $\Delta e_p$ to the change of grid potential $\Delta e_g$ producing it. This may be written $$\Delta e_g = \frac{\Delta e_p}{\mu}.$$

The potential of the member 35 being higher than that of the point o by an amount $rI$, where $r$ represents the resistance of the branch 12 of the resistor RB and I the plate current, the grid potential is increased by depression of the switch Sa by an amount $rI$. That is, $\Delta e_g = rI$ Equating the second members of the two equations, $$\frac{\Delta e_p}{\mu} = rI$$

or $$\Delta e_p = \mu rI$$

But the effective change in plate voltage $\Delta e_p$ is just balanced by the potential drop $RI$ across the resistor R so that plate current is constant. Therefore $$\mu I = RI$$

and $$\mu = \frac{R}{r}.$$

It is contemplated that all tests for $\mu$ shall be made at a single predetermined setting of the resistor RB or with the substitution of a fixed resistor therefor whereby the setting of R is a measure of the amplification factor of the tube. The amplification factor may be read from a suitably calibrated scale associated with the resistor R or on the meter M by the use of the local circuit established by the switch $Sm$ through E, R and M.

Ionization factor ($\psi$)

Ionization factor herein designated by the Greek letter $\psi$ is defined as the ratio of grid current $i$ to plate current $I$. This may be written $$\psi = \frac{i}{I}.$$

The grid current is a function of the gas content of the tube and is caused by ionization of such gas. In a tube possessing a high vacuum it is very small. The magnitude of the grid current depends both upon the amount of gas in the tube and the plate current. The ratio $\psi$ depends substantially only upon the amount of gas left in the tube.

Beginning with the various elements in the positions shown, the switch SW is moved so as to connect its member 31 with the point 39. A plate circuit is now established as described in connection with mutual conductance measurement, while the grid is at the potential of the point o, contact being made as hereinbefore described. If the key Si is now pressed the grid current will flow through the resistor 32. This will cause a change in grid potential of $\Omega i$ ($\Omega$ denoting the resistance of resistor 32) and an increase in plate current. With the key Si held open, the resistor 74, which will now be effective because of the opening of the short circuit through conductor 72, switch points 70 and 71 and conductor 73 will be adjusted until the current I through the meter M is the same as initially. It will be obvious that by the use of the variable resistor 74, controlled as shown by the switch Si, it will be possible to adjust the resistance of the plate circuit, while opening and closing said switch, until change of position of the switch produces no change of reading of the meter M. In this way it is possible to make an accurate setting of the resistor much more easily than when it is necessary to take an initial reading and then make the second conform thereto. Obviously voltage drop across the resistor 74 is equal to the voltage drop across the resistor 32. This may be written $$\Omega i = \omega I,$$

or $$\frac{i}{I} = \frac{\omega}{\Omega},$$

or (see preceding paragraph)

$$\psi = \frac{\omega}{\Omega},$$

$\omega$ denoting the resistance of resistor 74. Since $\Omega$ is to be a fixed value, the ratio $\psi$ can be read directly from a scale associated with the resistor 74.

While I have shown and described a preferred embodiment of my invention, I do not wish to be limited to the details thereof except in accordance with the scope of the appended claims.

Having thus described my invention, what I claim is:

1. A tube tester including, a variable resistor, means, including a plate circuit in which said resistor and a meter are connected, for indicating when said resistor has been set to such a position that its setting is a measure of a tube characteristic, and means for establishing an electric circuit through said resistor and an electric meter whereby to indicate the value of the setting of said resistor on said electric meter.

2. A tube tester including, a variable resistor, means, including a plate circuit in which said resistor and a meter are connected for indicating when said resistor has been set to such a position that its setting is a measure of a tube characteristic, and means for breaking said plate circuit and establishing a circuit through a source of current, said resistor and a meter.

3. A tube tester including, a variable resistor, means, including a plate circuit in which said resistor and a meter are connected for indicating when said resistor has been set to such a position that its setting is a measure of a tube characteristic, and means for breaking said plate circuit and establishing a circuit through a source of current, said resistor and said meter.

4. A tube tester embodying means for measuring the tube characteristic of amplification factor, said means comprising, a plate circuit including a source of current, a variable resistor, a meter and a second resistor, a grid circuit including means for changing the grid bias, and means for shorting out said variable resistor.

5. A tube tester embodying means for measuring ionization factor, said means comprising, a plate circuit including a source of current, a meter and a resistor in series, a grid circuit including a resistor, a switch normally completing shunt circuits around both said resistors and adapted upon actuation to break both said shunt circuits.

6. A tube tester embodying means for measuring ionization factor, said means comprising a plate circuit including a source of current, a meter and a plurality of resistors in series, a grid circuit including a resistor, and switch means controlling shunt circuits around said last mentioned resistor and one of said first mentioned resistors.

7. A tube tester embodying means for measuring ionization factor, said means comprising, a plate circuit including a source of current, a meter and a resistor in series, a grid circuit including a resistor, and a switch controlling shunt circuits around both said resistors.

JOB R. BARNHART.